Patented July 18, 1944

2,353,810

UNITED STATES PATENT OFFICE 2,353,810

SEPARATION OF SOLIDS FROM MIXTURES OF SOLIDS AND LIQUIDS

Edward L. Cole and Howard H. Gross, Beacon, N. Y., assignors to The Texas Company, New York, N. Y., a corporation of Delaware No Drawing. Application February 2, 1943, Serial No. 474,488

5 Claims. (Cl. 196—18)

This invention relates to the separation of solidifiable constituents from mixtures containing them and particularly by means of a selective solvent.

The invention particularly involves the separation of wax from a wax-bearing oil mixture by mixing with a solvent comprising a mixture of a wax antisolvent liquid and an oil solvent liquid in which the oil solvent consists essentially of an intermediate fraction of hydroformed naphtha. The mixture of wax-bearing oil and solvent in suitable proportions is brought to a temperature at which wax hydrocarbons separate from the mixture in solidified form, following which the solidified hydrocarbons are removed by settling, filtration or other means.

The invention, however, is applicable to the separation of wax-like and other solidifiable bodies from mixtures containing them.

More specifically the oil solvent component of the solvent mixture comprises a hydrocarbon fraction boiling in the range about 260 to 280° F. separated from hydroformed naphtha. Advantageously the naphta fraction has been subjected to treatment to remove polymerizable and other unstable constituents.

The invention has particular application in the dewaxing of wax-bearing oils for the production of low pour test lubricating oil and also has application in the deoiling of wax concentrates such as obtained in the dewaxing of lubricating oil stocks.

It is customary in dewaxing of lubricating oil stocks to employ dewaxing solvents composed of a wax antisolvent liquid such as a low boiling aliphatic ketone and an oil solvent liquid such as benzene or toluene. Benzene and toluene are in great demand during war time and, therefore, it may be desirable to employ a suitable substitute for the aromatic component of such conventional dewaxing solvents.

The present invention is, therefore, concerned with the employment of a suitable substitute. It has now been found that an intermediate fraction of hydroformed naphtha is effective for this purpose.

Hydroformed naphtha is obtained by subjecting straight-run naphtha to contact with a catalyst such as the oxides of chromium, molybdenum and vanadium supported upon alumina.

The hydroforming reaction is effected at a temperature in the range about 950 to 1050° F. and under a pressure in the range 200 to 400 pounds. The reaction is also effected in the presence of a relatively large amount of hydrogen or hydrogen-containing gas. Usually the conversion is carried out by passing the feed naphtha in vapor form through a bed of the solid catalyst at a space velocity of about 0.5 to 2 (space velocity being volume of feed, measured as liquid at 60° F., charged per hour per volume of catalyst) in the presence of a large amount of recycled gas containing at least about 30 to 50% uncombined or free hydrogen. Under these conditions a naphtha product is obtained having approximately the following characteristics:

| | |
|---|---|
| A. P. I gravity | 48.7 |
| A. S. T. M. distillation: | |
|   I. B. P., °F | 98 |
|   50% | 273 |
|   E. P. | 406 |
| Aniline point, °F | 58.2 |
| Bromine additive number | 5 |
| Aromatic content, per cent by weight: | |
|   Benzene | 1.2 |
|   Toluene | 9.1 |
|   Higher boiling | 33.1 |

By subjecting this naphtha to fractional distillation a number of fractions may be obtained including the following with the characteristics noted:

| | Fraction No. | | |
|---|---|---|---|
| | 2 | 3 | 4 |
| Boiling Range, °F | 240-260 | 260-280 | 280-300 |
| Distillation, A. S. T. M.: | | | |
|   I. B. P., °F | 244 | 268 | 282 |
|   50% | 250 | 273 | 288 |
|   E. P. | 270 | 279 | 308 |
| Aniline point, °F | 131 | Below 32 | 50.4 |
| Bromine additive number | 8 | 2 | 3 |
| Aromatic content, percent by weight: | | | |
|   Benzene | None | None | None |
|   Toluene | 3.1 | None | None |
|   Higher boiling | 8.5 | 57.7 | 42.4 |

These fractions were treated to remove the less stable olefinic constituents which might polymerize to undesirable constituents during use of the fractions as a solvent. Each fraction was treated with two batches of cold sulfuric acid of 98% concentration, the acid amounting to 5 pounds of acid per barrel of hydrocarbon treated in each batch. The acid treatment is carried out at a temperature of about 70° F. Following acid treatment the hydrocarbons were washed with water and neutralized with caustic followed again by water washing, the washed hydrocarbons being subjected to redistillation to remove any light or heavy ends. The resulting treated fractions had the following approximate characteristics:

| | Fraction No. | | |
|---|---|---|---|
| | 2 | 3 | 4 |
| Gravity, A. P. I. | | 40.2 | |
| Bromine number | 5 | 2 | 2 |
| I. B. P., °F | 244 | 268 | 277 |
| E. P., °F | 1 281 | 284 | 302 |

1 95% point was 256° F.

Separate quantities of each of these treated hydrocarbon fractions were mixed with methylethyl ketone to provide dewaxing solvent liquid mixtures. These solvent mixtures were then compared with a mixture of methylethyl ketone and benzol in dewaxing separate quantities of a wax distillate lubricating oil stock having an A. P. I. gravity of about 28.5, a Saybolt Universal viscosity at 210° F. of about 68 seconds, and a pour test of about 115° F. The oil in question contained about 15% paraffin.

In each instance the wax-bearing oil was diluted with the solvent mixture in the proportion of 4 parts of solvent liquid mixture to 1 part of oil by volume. The resulting mixtures were chilled and filtered, the solvent being stripped from the filtrate to determine the yield of dewaxed oil, the pour test of the dewaxed oil being not greatly above the filtering temperature at which the wax was separated from the chilled solution.

The composition of the solvent in each instance, the filtering temperature and the yields and rates are compared in the following table:

| | Runs | | | |
|---|---|---|---|---|
| | 1 | 2 | 3 | 4 |
| Solvent composition, percent by volume | MEK, 50<br>Benzol, 50 | MEK, 60<br>Fraction 2, 40 | MEK, 60<br>Fraction 3, 40 | MEK, 60.<br>Fraction 4, 40. |
| Filtering temperature, °F | −13 | −20 | −19 | −20. |
| Yield of dewaxed oil, percent by. vol., basis charge oil 1 | 79.5 | 83.8 | 81.2 | 83.2. |
| Dewaxing temperature differential, °F | 5 | 24 | 10 | 14. |
| Filtering time in seconds | 25 | 75 | 25 | 45. |
| Cycle rate, gallons of dewaxed oil per hour per square foot filtering surface, basis 80% yield | 4.0 | 1.31 | 2.23 | 1.53. |

1 These yields are obtained by subjecting the filter cake to washing with fresh solvent liquid in the proportion of 1.5 parts by volume of solvent to 1 part of charge oil.

In the foregoing tabulation the term "dewaxing differential" refers to the difference in °F. between the pour test of the dewaxed oil and the filtering temperature. Examination of the results presented in the foregoing table indicates that a dewaxing solvent containing the intermediate fraction boiling in the range 268 to 284° F. gives a higher cycle rate than is obtained with a dewaxing solvent containing either the lower boiling fraction or the higher boiling fraction.

Moreover, the dewaxing temperature differential is smaller with this intermediate fraction, approaching more nearly that attained with a mixture of methylethyl ketone and benzol.

It has been found that by increasing the methylethyl ketone content of a solvent mixture composed of the ketone and this intermediate fraction the dewaxing results will be approximately those obtained with equal parts of ketone and benzol. Thus, a dewaxing solvent composed of 66% ketone and 34% of the intermediate fraction of hydro-formed naphtha will result in a slightly higher yield of dewaxed oil for a given wash, approximately the same cycle rate, and a dewaxing temperature differential not appreciably or only slightly greater than obtains with a conventional ketone-benzol dewaxing solvent.

In other words, it is contemplated that dewaxing solvent mixtures composed of methylethyl ketone and the aforesaid intermediate fraction may contain from about 50 to 70% of the ketone, the amount actually used being dependent to some extent upon the oil undergoing treatment as well as upon the degree of dewaxing desired. The proportions of solvent mixture to wax-bearing oil may also be varied, usually the composition of the solvent and the proportion of solvent to oil being adjusted so as to obtain a dewaxed oil having a pour test corresponding substantially to the temperature at which the wax is removed from the chilled wax-bearing mixture.

The actual procedure employed in carrying out the dewaxing operation is now well understood in the art and needs no particular description.

While mention has been made of the distillation range of the intermediate fraction of hydroformate, it is desirable that this fraction as used in dewaxing should also be characterized by having a Saybolt color not darker than plus 25, a bromine number not greater than 2 and an acid wash not darker than 10.

While methylethyl ketone has been mentioned specifically as an example of a wax antisolvent liquid nevertheless it is contemplated that other low boiling ketones such as acetone may be used as well as other types of antisolvents, including benzaldehyde, nitrobenzene, ethylene dichloride, dichlorethyl ether, etc.

In addition it is contemplated that the invention has application to the separation of solidifiable constituents from oils derived from other than petroleum sources, as, for example, animal and vegetable oils and fatty acids.

Obviously many modifications and variations of the invention as above set forth may be made without departing from the spirit and scope thereof, and therefore only such limitations should be imposed as are indicated in the appended claims.

We claim:

1. In a process for separating wax from wax-bearing oil wherein the wax-bearing oil is diluted with a solvent liquid comprising a mixture of a wax antisolvent and an oil solvent and the resulting diluted mixture brought to a temperature at which wax hydrocarbons are solidified, following which the solidified hydrocarbons are removed from the mixture, the steps comprising diluting the wax-bearing oil with a solvent comprising a wax antisolvent liquid and a hydrocarbon fraction boiling in the range about 260 to 280° F. separated from hydroformed straight-run naphtha and substantially free from polymerizable and unstable constituents, adjusting the temperature of the dilute mixture to solidify wax constituents, and removing the solidified wax constituents therefrom.

2. In a process for separating wax from wax-bearing oil wherein the wax-bearing oil is diluted with a solvent liquid comprising a mixture of a wax antisolvent and an oil solvent and the resulting diluted mixture brought to a temperature at which wax hydrocarbons are solidified, following which the solidified hydrocarbons are removed from the mixture, the steps comprising diluting the wax-bearing oil with a solvent comprising about 50 to 70% wax antisolvent and the remainder being a hydrocarbon fraction boiling in the range about 260 to 280° F. separated from hydroformed straight-run naphtha and substantially free from polymerizable and unstable constituents, adjusting the temperature of the dilute mixture to solidify wax constituents, and removing the solidified wax constituents therefrom.

3. In a process for separating wax from wax-bearing oil wherein the wax-bearing oil is diluted with a solvent liquid comprising a mixture of a wax antisolvent and an oil solvent and the resulting diluted mixture brought to a temperature at which wax hydrocarbons are solidified, following which the solidified hydrocarbons are removed from the mixture, the steps comprising diluting the wax-bearing oil with solvent composed of wax antisolvent liquid and a hydrocarbon fraction boiling in the range about 260 to 280° F. obtained by fractional distillation of naphtha produced by subjecting straight run naphtha to the action of a dehydrogenating catalyst in the presence of hydrogen at a temperature in the range about 950 to 1050° F. and under a pressure in the range about 200 to 400 pounds, adjusting the temperature of the dilute mixture to solidify wax constituents, and removing the solidified wax constituents therefrom.

4. In a process for separating wax from wax-bearing oil wherein the wax-bearing oil is diluted with a solvent liquid comprising a mixture of a wax antisolvent and an oil solvent and the resulting diluted mixture brought to a temperature at which wax hydrocarbons are solidified, following which the solidified hydrocarbons are removed from the mixture, the steps comprising diluting the wax-bearing oil with a solvent comprising methylethyl ketone and a hydrocarbon fraction boiling in the range about 260 to 280° F. separated from hydroformed straight-run naphtha and substantially free from polymerizable and unstable constituents, adjusting the temperature of the dilute mixture to solidify wax constituents, and removing the solidified wax constituents therefrom.

5. A process for separating solidifiable constituents from liquid mixtures containing them which comprises diluting the feed mixture with a solvent liquid comprising a hydrocarbon fraction boiling in the range about 260 to 280° F. separated from hydroformed straight-run naphtha and substantially free from polymerizable and unstable constituents, adjusting the temperature of the dilute mixture to solidify said solidifiable constituents, and removing the solidified constituents therefrom.

EDWARD L. COLE.
HOWARD H. GROSS.